United States Patent
Fan et al.

(10) Patent No.: US 8,599,808 B2
(45) Date of Patent: Dec. 3, 2013

(54) INFORMATION TRANSMISSION METHOD AND APPARATUS

(75) Inventors: Shuju Fan, Shanghai (CN); Jing Li, Shanghai (CN); Xueli Ma, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 13/218,783

(22) Filed: Aug. 26, 2011

(65) Prior Publication Data

US 2011/0305204 A1 Dec. 15, 2011

Related U.S. Application Data

(63) Continuation of application No. PCT/CN2009/070590, filed on Feb. 27, 2009.

(51) Int. Cl.
*H04W 4/00* (2009.01)

(52) U.S. Cl.
USPC ........... 370/338; 370/333; 370/328; 370/329; 370/322; 370/345; 455/69; 455/422.1

(58) Field of Classification Search
USPC ................. 370/345, 322, 329, 328, 333, 338; 455/69
See application file for complete search history.

(56) References Cited

U.S. PATENT DOCUMENTS

| | | | |
|---|---|---|---|
| 2006/0077947 A1* | 4/2006 | Kim et al. | 370/349 |
| 2008/0080431 A1* | 4/2008 | Zeira et al. | 370/333 |
| 2009/0164862 A1* | 6/2009 | Sagfors et al. | 714/748 |
| 2010/0130219 A1* | 5/2010 | Cave et al. | 455/450 |

FOREIGN PATENT DOCUMENTS

| | | |
|---|---|---|
| CN | 1774122 | 5/2006 |
| CN | 1871792 | 11/2006 |
| CN | 101207426 | 6/2008 |
| CN | 101207427 | 6/2008 |
| CN | 101217682 | 7/2008 |
| CN | 101237297 | 8/2008 |
| WO | 2005/099125 | 10/2005 |
| WO | 2008/022243 | 2/2008 |
| WO | 2009/023850 | 2/2009 |

OTHER PUBLICATIONS

"$3^{rd}$ Generation Partnership Project; Technical Specification Group Radio Access Network; Multiplexing and channel coding (FDD) (Release 8)", 3GPP TS 25.212 V8.4.0, Dec. 2008, pp. 1-103.
International Search Report issued Dec. 3, 2009 in corresponding International Patent Application No. PCT/CN2009/070590.
Extended European Search Report issued Dec. 22, 2011 in corresponding European Patent Application No. 09840638.2.

(Continued)

*Primary Examiner* — Kibrom T Hailu
*Assistant Examiner* — Zewdu A Beyen
(74) *Attorney, Agent, or Firm* — Staas & Halsey LLP

(57) ABSTRACT

Embodiments of the present invention provide an information transmission method and apparatus. The method includes: encoding an information bit sequence corresponding to data stream control information and Precoding Control Indication (PCI) information to obtain a code sequence; and sending the code sequence to a NodeB by carrying the code sequence on a Physical Uplink Control Channel (PUCCH). With the present invention, a User Equipment (UE) in a macro diversity state feeds back PCI information to the NodeB of the non-serving cell in time.

12 Claims, 5 Drawing Sheets

(56) References Cited

OTHER PUBLICATIONS

Chinese Office Action issued Sep. 24, 2012 in corresponding Chinese Patent Application No. 200980123742.0.
English Translation of Chinese Patent Application No. 200710003064 (Publication No. 101237297), of record.

Written Opinion of the International Searching Authority, mailed Dec. 3, 2009, in International Application No. PCT/CN2009/070590 (4 pp.).
International Search Report for PCT/CN2009/070590, mailed Dec. 3, 2009.
European Office Action mailed Aug. 19, 2013 in corresponding European Patent Application No. 09 840 638.2-1860 (4 pages).

* cited by examiner

INFORMATION TRANSMISSION METHOD AND APPARATUS

CROSS-REFERENCE TO RELATED APPLICATIONS

This application is a continuation of International Application NO. PCT/CN2009/070590, filed on Feb. 27, 2009, which is hereby incorporated by reference in its entirety.

FIELD OF THE INVENTION

The present invention relates to wireless communication technologies, and in particular, to an information transmission method and apparatus.

BACKGROUND OF THE INVENTION

Because the radio propagation environment is adverse, signals transmitted by a Base Station (BS) in a wireless communication network are usually reflected, scattered, and refracted repeatedly before arriving at the receiver of a Mobile Station (MS), which tends to cause multi-path fading of signals. In a fading environment, multi-antenna diversity technology can improve the performance of the wireless communication system effectively.

Closed Loop Transmit Diversity (CLTD) and Multiple Input Multiple Output (MIMO) are examples of the multi-antenna diversity technology.

In CLTD mode, it is assumed that the uplink (UL) CLTD is the same as the downlink (DL) CLTD except for different transmission channels. In UL CLTD mode, a User Equipment (UE) combines signals of several channels and then scrambles the signals. The signals are transmitted through two or more antennas after the signals on each antenna are multiplied by a weight value. The weight values are $w_1 = 1/\sqrt{2}$ and $$w_2 \in \left\{ \frac{1+j}{2}, \frac{1-j}{2}, \frac{-1+j}{2}, \frac{-1-j}{2} \right\}.$$

The value of $w_2$ depends on the downlink Precoding Control Indication (PCI) information.

The BS (such as a NodeB) calculates the weighted sum of signals of two data streams after receiving the signals of the two data streams. The weight values are $w_1$ and $w_2$ used by the UE at the time of transmitting the signals.

In the process of implementing the present invention, the inventor of the present invention finds at least the following problems in the prior art: In a macro diversity state, the signals transmitted by the UE are received by multiple cells simultaneously, and are soft-combined; the two received data streams cannot be combined correctly unless the NodeB of non-serving cells also obtains the PCI information in time; but non-serving cells are unable to obtain the PCI information in time currently. The MIMO mode is also baffled by this problem.

SUMMARY OF THE INVENTION

Embodiments of the present invention provide an information transmission method and apparatus for a main purpose of providing PCI information for non-serving cells in time in a macro diversity state.

In order to implement the purpose, one embodiment of the present invention provides an information transmission method. The method includes:

encoding an information bit sequence corresponding to data stream control information and PCI information to obtain a code sequence; and sending the code sequence to a NodeB by carrying the code sequence on a Physical Uplink Control Channel (PUCCH).

Another embodiment of the present invention provides a UE. The UE includes:

an encoding unit, configured to encode an information bit sequence corresponding to data stream control information and PCI information to obtain a code sequence; and a transmitting unit, configured to send the code sequence to a NodeB by carrying the code sequence on a PUCCH.

Embodiments of the present invention solve the problem of providing the non-serving cells the PCI information by carrying the PCI information on the PUCCH.

BRIEF DESCRIPTION OF THE DRAWINGS

The drawings listed below are intended to help understand the present invention and constitute a part of this application, but shall not be construed as limitations on the present invention.

DETAILED DESCRIPTION OF THE EMBODIMENTS

To make the technical solution, objectives and merits of the present invention clearer, the following describes the embodiments of the present invention in detail with reference to the accompanying drawings. The exemplary embodiments of the present invention and the description thereof are illustrative in nature, and shall not be construed as limitations on the present invention.

Embodiment 1

An information transmission method is provided in this embodiment. In this method, the PCI information is carried on a PUCCH such as an Enhanced Dedicated Physical Control Channel (E-DPCCH, or E-DCH).

Figure 2:
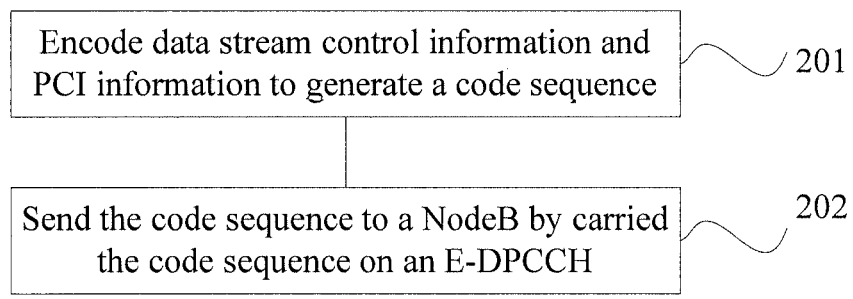
FIG. 2 is a schematic flowchart of a method for using an E-DPCCH according to a first embodiment of the present invention.

As shown in FIG. 2, the method includes the following steps:

Step 201: Encode an information bit sequence corresponding to data stream control information and PCI information to obtain a code sequence.

The code sequence may be one sequence or be composed of two sequences.

Step 201 may have multiple variations, which are detailed in the embodiments described below.

Step 202: Send the code sequence to a NodeB by carrying the code sequence on a PUCCH.

In a High Speed Uplink Packet Access (HSUPA) technology, the PUCCH may be an E-DPCCH. However, the specific form of the PUCCH shall not be construed as a limitation on the present invention.

This embodiment is applicable not only to the uplink CLTD mode, but also to the modes such as single-stream MIMO and dual-stream MIMO. In dual-stream MIMO mode, two different data streams exist, and the UE needs to configure the corresponding control information for both data streams. In this case, two E-DPCCHs may be applied, and each E-DPCCH controls one data stream. The PCI information may be carried on either E-DPCCH. In this way, the UE can broadcast PCI information to the NodeB.

In this embodiment, the UE in a macro diversity state feeds back PCI information to the NodeB of the non-serving cell, and the non-serving cell obtains the PCI information in time.

Embodiment 2

This embodiment provides an information transmission method in CLTD mode.

The format of the timeslot used by an E-DPCCH in 3GPP R8 protocol is shown in Table 1, and the control information carried on the E-DPCCH is shown in Table 2.

TABLE 1

| E-DPCCH timeslot format | | | | | |
|---|---|---|---|---|---|
| Slot Format #i | Channel Bit Rate (kbps) | Spread Factor (SF) | Bits/ Frame | Bits/ Subframe | Bits/Slot $N_{data}$ |
| 0 | 15 | 256 | 150 | 30 | 10 |

TABLE 2

| Control information carried on an E-DPCCH | | |
|---|---|---|
| Carried Information | Amount of Information | Content |
| Retransmission Sequence Number (RSN) | 2 | xrsn, 1, xrsn, 2 |
| E-DCH Transport Format Combination Indicator (E-TFCI) | 7 | xtfci, 1, xtfci, 2, . . . , xtfci, 7 |
| "Happy" bit | 1 | xh, 1 |

According to Table 2, the information carried on the E-DPCCH is the associated signaling (namely, control information) of uplink data streams of the E-DPCCH, and includes a 7-bit E-TFCI, a 2-bit RSN and a 1-bit Happy bit.

Figure 1:
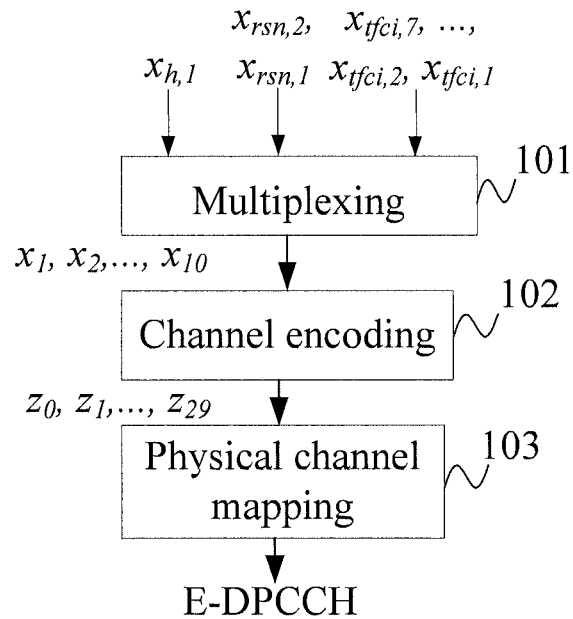
FIG. 1 is a schematic flowchart of encoding control information carried on an E-DPCCH based on Release 8 (R8) of the 3rd Generation Partnership Project (3GPP) in the prior art.

FIG. 1 is a schematic flowchart of encoding control information carried on an E-DPCCH based on 3GPP R8 protocol. The encoding procedure includes the following steps:

Step 101: Multiplex the control information bit sequence to obtain an output bit sequence.

The output bit sequence fulfills:

$$x_k = \begin{cases} x_{h,1} & k = 1 \\ x_{rsn,4-k} & k = 2, 3 \\ x_{tfci,11-k} & k = 4, 5, \ldots, 10. \end{cases}$$

Step 102: Encode the output bit sequence to obtain a code sequence. The sequence is encoded through:

$$z_i = \sum_{n=0}^{9} (x_{n+1} \times M_{i,n}) \bmod 2, \; i = 0, 1, \ldots, 29.$$

In the formula above, $z_i$ are code elements of the code sequence, and $M_{i,n}$ are elements of a (30, 10) second-order Reed-Muller (RM) code matrix. The RM code matrix is as shown in Table 3:

TABLE 3

| (30, 10) second-order RM code matrix | | | | | | | | | | |
|---|---|---|---|---|---|---|---|---|---|---|
| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |

TABLE 3-continued (30, 10) second-order RM code matrix

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |

Step 103: Send the encoded data stream control information to a NodeB by carrying the encoded data stream control information on an E-DPCCH.

This step is a mapping step of the physical channel, i.e., after the control information code sequence is obtained, the code sequence can be mapped (namely, carried) onto the E-DPCCH, and sent to the NodeB.

Evidently, in 3GPP R8 protocol, the E-DPCCH carries only 10-bit uplink data control information.

In this embodiment of the present invention, the E-DPCCH carries not only the 10-bit uplink data control information, but also PCI information. The PCI information is generally 2 bits. When the E-DPCCH carries the PCI information additionally, the information bits carried on the E-DPCCH increase from 10 bits to 12 bits.

To make the codes that carry the PCI information still compliant with the existing channel structure or timeslot format, this embodiment modifies the encoding mode so that the control information and the PCI information of the uplink data are still 30 bits after being encoded.

In CLTD mode, the PCI information is fed back through an E-DPCCH, and the information carried on the E-DPCCH increases from 10 bits to 12 bits. The E-DPCCH carries the following information:

TABLE 4

Information carried on E-DPCCH

| Carried Information | Amount of Information/Bits | Content |
|---|---|---|
| RSN | 2 | xrsn, 1, xrsn, 2 |
| E-TFCI | 7 | xtfci, 1, xtfci, 2, . . . , xtfci, 7 |
| "Happy" bit | 1 | xh, 1 |
| PCI | 2 | xpci, 1, xpci, 2 |

The PCI is a newly added information field.

Figure 3:
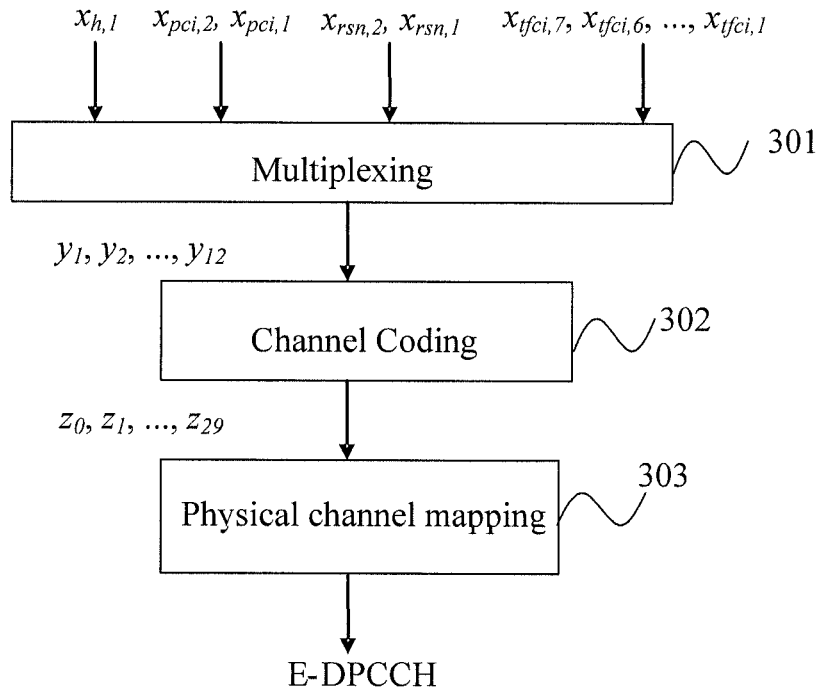
FIG. 3 is a schematic flowchart of a method for using an E-DPCCH according to a second embodiment of the present invention.

As shown in FIG. 3, the information transmission method in this embodiment includes the following steps:

Step 301: Multiplex information bit sequence that needs to be carried on an E-DPCCH in Table 4 to obtain a 12-bit output bit sequence $y_1, y_2, \ldots, y_k, \ldots, y_{12}$, where $y_k$ is the output bit in the sequence and $k=1, 2, \ldots, \ldots 12$.

An exemplary input-output relationship in the multiplexing process is:

$$y_k = \begin{cases} x_{h,1} & k = 1 \\ x_{pci,4-k} & k = 2, 3 \\ x_{rsn,6-k} & k = 4, 5 \\ x_{tfci,13-k} & k = 6, 7, \ldots, 12; \end{cases}$$

Step 302: Perform channel encoding for the multiplexed output bit sequence to obtain a 30-bit code sequence according to a code matrix and a linear combination formula. The linear combination formula may be:

$$z_i = \sum_{n=0}^{11} (y_{n+1} \times M_{i,n}) \bmod 2, \text{ where, } i = 0, \ldots, 29.$$

In the formula above, $z_i$ are code elements of the code sequence, $y_{n+1}$ are output bits in the output bit sequence, and $M_{i,n}$ are elements in the code matrix.

In this embodiment, the code matrix is a (30, 12) second-order matrix.

For example, the (30, 10) second-order Reed-Muller code matrix shown in Table 3 may be reconstructed to obtain a (30, 12) second-order code matrix, which is used in E-DPCCH channel encoding in CLTD mode, as shown in the following table. However, the present invention is not limited to such a (30, 12) second-order code matrix.

TABLE 5

(30, 12) second-order RM code matrix

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ |
|---|---|---|---|---|---|---|---|---|---|---|---|---|
| 0 | 1 | 0 | 0 | 0 | 0 | 1 | 0 | 0 | 0 | 0 | 0 | 0 |
| 1 | 0 | 1 | 0 | 0 | 0 | 1 | 1 | 0 | 0 | 0 | 0 | 0 |
| 2 | 1 | 1 | 0 | 0 | 0 | 1 | 0 | 0 | 0 | 1 | 0 | 0 |

TABLE 5-continued (30, 12) second-order RM code matrix

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ |
|---|---|---|---|---|---|---|---|---|---|---|---|---|
| 3  | 0 | 0 | 1 | 0 | 0 | 1 | 1 | 0 | 1 | 1 | 0 | 0 |
| 4  | 1 | 0 | 1 | 0 | 0 | 1 | 0 | 0 | 0 | 1 | 0 | 0 |
| 5  | 0 | 1 | 1 | 0 | 0 | 1 | 0 | 0 | 1 | 0 | 0 | 0 |
| 6  | 1 | 1 | 1 | 0 | 0 | 1 | 0 | 1 | 0 | 0 | 0 | 0 |
| 7  | 0 | 0 | 0 | 1 | 0 | 1 | 0 | 1 | 1 | 0 | 0 | 0 |
| 8  | 1 | 0 | 0 | 1 | 0 | 1 | 1 | 1 | 1 | 0 | 0 | 0 |
| 9  | 0 | 1 | 0 | 1 | 0 | 1 | 1 | 0 | 1 | 1 | 1 | 0 |
| 10 | 1 | 1 | 0 | 1 | 0 | 1 | 0 | 0 | 1 | 1 | 0 | 1 |
| 11 | 0 | 0 | 1 | 1 | 0 | 1 | 0 | 1 | 1 | 0 | 0 | 1 |
| 12 | 1 | 0 | 1 | 1 | 0 | 1 | 0 | 1 | 0 | 1 | 1 | 0 |
| 13 | 0 | 1 | 1 | 1 | 0 | 1 | 1 | 0 | 0 | 1 | 0 | 0 |
| 14 | 1 | 1 | 1 | 1 | 0 | 1 | 1 | 1 | 1 | 1 | 0 | 1 |
| 15 | 1 | 0 | 0 | 0 | 1 | 1 | 1 | 1 | 0 | 0 | 0 | 0 |
| 16 | 0 | 1 | 0 | 0 | 1 | 1 | 1 | 1 | 0 | 1 | 1 | 0 |
| 17 | 1 | 1 | 0 | 0 | 1 | 1 | 1 | 0 | 1 | 0 | 1 | 0 |
| 18 | 0 | 0 | 1 | 0 | 1 | 1 | 1 | 0 | 1 | 1 | 1 | 0 |
| 19 | 1 | 0 | 1 | 0 | 1 | 1 | 0 | 1 | 0 | 1 | 0 | 1 |
| 20 | 0 | 1 | 1 | 0 | 1 | 1 | 0 | 0 | 1 | 1 | 1 | 0 |
| 21 | 1 | 1 | 1 | 0 | 1 | 1 | 0 | 1 | 1 | 1 | 0 | 1 |
| 22 | 0 | 0 | 0 | 1 | 1 | 1 | 0 | 1 | 0 | 0 | 1 | 1 |
| 23 | 1 | 0 | 0 | 1 | 1 | 1 | 1 | 0 | 1 | 1 | 1 | 0 |
| 24 | 0 | 1 | 0 | 1 | 1 | 1 | 1 | 0 | 1 | 0 | 0 | 1 |
| 25 | 1 | 1 | 0 | 1 | 1 | 1 | 1 | 0 | 0 | 1 | 1 | 1 |
| 26 | 0 | 0 | 1 | 1 | 1 | 1 | 0 | 0 | 1 | 0 | 1 | 0 |
| 27 | 1 | 0 | 1 | 1 | 1 | 1 | 1 | 0 | 0 | 0 | 0 | 1 |
| 28 | 0 | 1 | 1 | 1 | 1 | 1 | 1 | 1 | 1 | 0 | 1 | 0 |
| 29 | 1 | 1 | 1 | 1 | 1 | 1 | 1 | 1 | 1 | 1 | 0 | 1 |

Step 303: Send the code sequence to a NodeB by carrying the code sequence obtained after encoding on the E-DPCCH.

This step is a mapping step of the physical channel, i.e., after the code sequence of control information and PCI information is obtained, the code sequence can be mapped (namely, carried) onto the E-DPCCH, and sent to the NodeB.

In this embodiment, the non-serving cell can obtain the PCI information from the UE in time through the E-DPCCH, and the NodeB of the cell can perform correct decoding at lower power.

Embodiment 3

This embodiment provides another information transmission method in CLTD mode.

In this embodiment, the information that needs to be carried on the E-DPCCH is divided into two parts: part 1 and part 2, which are encoded in different ways. The information carried on the E-DPCCH and the modes of encoding the information are shown in Table 6.

TABLE 6

Information carried on E-DPCCH and mode of encoding the information

| | Carried Information | Amount of Information | Encoding Mode |
|---|---|---|---|
| Part 1 | PCI | 2 | Mapped to a 10-bit 0-1 sequence |
| Part 2 | RSN E-TFCI "Happy" bit | 10 | (20, 10) RM encoding |

Figure 4:
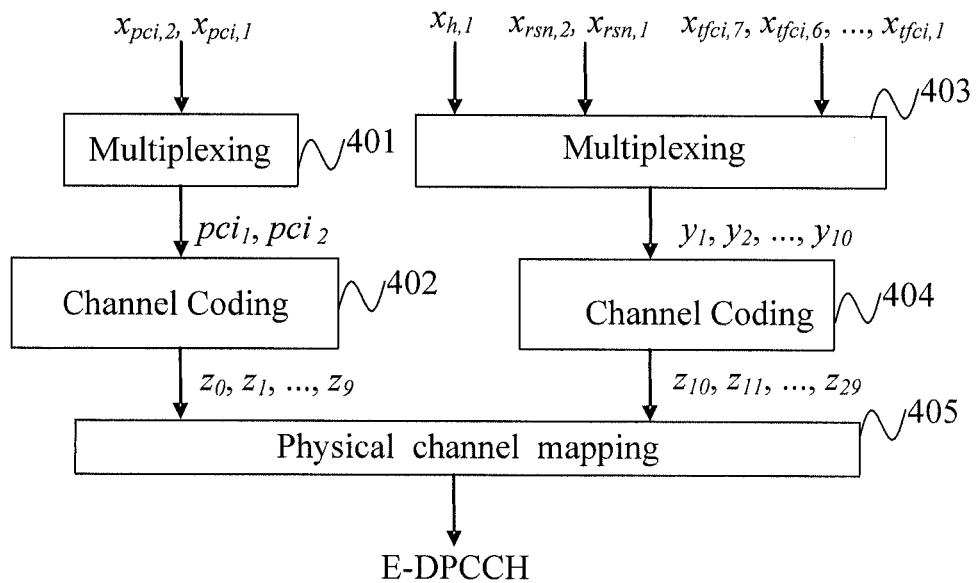
FIG. 4 is a schematic flowchart of a method for using an E-DPCCH according to a third embodiment of the present invention.

As shown in FIG. 4, the information transmission method in this embodiment includes the following steps:

Step 401: Multiplex a bit sequence of PCI information to obtain a 2-bit output bit sequence of the PCI information.

In the multiplexing process, the input-output relationship may be:

$$pci_k = x_{pci,3-k}, k=1,2.$$

Step 402: Encode the output bit sequence of the PCI information to obtain a first code sequence composed of 10 bits.

In this step, the PCI part may be encoded through direct mapping manner, i.e., the output bit sequence of the PCI information is mapped to a code sequence directly according to a preset mapping relationship. The mapping relationship meets the following conditions: The output bit sequence corresponding to each PCI is mapped to a codeword uniquely, and code set composed of all codewords has the greatest minimum code distance.

The minimum code distance of the code set refers to the minimum value of the code distance between different codewords in a code set composed of a certain number of codewords. The codewords are 0-1 sequences that have the same sequence length. The code set with the greatest minimum code distance means that: The minimum code distance of this code set is greater than the minimum code distance of any other code set composed of the same number of codewords.

Table 7 shows an exemplary direct mapping relationship between the output bit sequence and the code sequence in this embodiment.

TABLE 7

PCI encoding and mapping relationship

| PCI | | Codeword | | | | | | | | | |
|---|---|---|---|---|---|---|---|---|---|---|---|
| $pci_1$ | $pci_2$ | $Z_0$ | $Z_1$ | $Z_2$ | $Z_3$ | $Z_4$ | $Z_5$ | $Z_6$ | $Z_7$ | $Z_8$ | $Z_9$ |
| 0 | 0 | 1 | 0 | 1 | 0 | 1 | 1 | 1 | 1 | 0 | 1 |
| 0 | 1 | 1 | 1 | 0 | 1 | 0 | 1 | 0 | 1 | 1 | 1 |
| 1 | 0 | 0 | 1 | 1 | 1 | 1 | 0 | 1 | 0 | 1 | 1 |
| 1 | 1 | 1 | 0 | 0 | 1 | 0 | 0 | 1 | 0 | 0 | 0 |

In Table 7, the output bit sequence (pci1, pci2) corresponding to each PCI is mapped to a codeword ($z_1$, $z_2$, $z_3$, $z_4$, $z_5$, $z_6$, $z_7$, $z_8$, $z_9$) uniquely. In this table, the minimum code distance of the code set composed of 4 codewords is 6, and is the maximum value of the minimum code distance of a quadruple code set. That is, there is no quadruple code set whose minimum code distance is greater than 6.

The codeword corresponding to the code sequence in Table 7 is only an example, and shall not be construed as a limitation on the present invention. The codewords of this code sequence may be any four codewords whose code distance is 6. For example, the order of the columns in Table 7 may be changed randomly, and the columns may be negated randomly (namely, 0 changes to 1, and 1 changes to 0).

Step 403: Multiplex the bit sequence of data stream control information to obtain a 10-bit output bit sequence of the data stream control information.

In the multiplexing process, the input-output relationship may be:

$$y_k = \begin{cases} x_{h,1} & k = 1 \\ x_{rsn,4-k} & k = 2, 3 \\ x_{tfci,11-k} & k = 4, 5, \ldots, 10; \end{cases}$$

Step 404: Encode the output bit sequence of the data stream control information to obtain a second code sequence composed of 20 bits according to a code matrix and a linear combination formula. The linear combination formula may be:

$$z_{i+10} = \sum_{n=0}^{0} (y_{n+1} \times M_{i,n}) \bmod 2, \ i = 0, \ldots, 19.$$

In the formula above, $z_{i+10}$ are code elements of the second code sequence, $y_{n+1}$ are output bits in the output bit sequence of data stream control information, and $M_{i,n}$ are elements in the code matrix.

The (20, 10) RM matrix used in this embodiment is as shown in Table 8:

TABLE 8

(20, 10) Reed-Muller code matrix

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 0 | 0 | 0 | 0 | 0 |
| 1 | 0 | 1 | 0 | 0 | 0 | 0 | 0 | 0 | 0 | 0 |
| 2 | 0 | 0 | 0 | 1 | 0 | 0 | 0 | 0 | 0 | 0 |
| 3 | 0 | 0 | 0 | 0 | 1 | 0 | 0 | 0 | 0 | 0 |
| 4 | 0 | 0 | 0 | 0 | 0 | 1 | 0 | 0 | 0 | 0 |
| 5 | 0 | 0 | 0 | 0 | 0 | 0 | 1 | 0 | 0 | 0 |
| 6 | 0 | 0 | 0 | 0 | 0 | 0 | 0 | 0 | 1 | 0 |
| 7 | 0 | 0 | 0 | 0 | 0 | 0 | 0 | 0 | 0 | 1 |
| 8 | 1 | 0 | 1 | 0 | 0 | 0 | 1 | 1 | 1 | 0 |
| 9 | 1 | 1 | 0 | 1 | 0 | 0 | 0 | 1 | 1 | 1 |
| 10 | 0 | 1 | 1 | 0 | 1 | 0 | 0 | 0 | 1 | 1 |
| 11 | 1 | 0 | 1 | 1 | 0 | 1 | 0 | 0 | 0 | 1 |
| 12 | 1 | 1 | 0 | 1 | 1 | 0 | 1 | 0 | 0 | 0 |
| 13 | 1 | 1 | 1 | 0 | 1 | 1 | 0 | 1 | 0 | 0 |
| 14 | 0 | 1 | 1 | 1 | 0 | 1 | 1 | 0 | 1 | 0 |
| 15 | 0 | 0 | 1 | 1 | 1 | 0 | 1 | 1 | 0 | 1 |
| 16 | 0 | 0 | 0 | 1 | 1 | 1 | 0 | 1 | 1 | 0 |
| 17 | 1 | 0 | 0 | 0 | 1 | 1 | 1 | 0 | 1 | 1 |
| 18 | 0 | 1 | 0 | 0 | 0 | 1 | 1 | 1 | 0 | 1 |
| 19 | 1 | 1 | 1 | 1 | 1 | 1 | 1 | 1 | 1 | 1 |

Step 405: Send the code sequence, obtained by encoding, for example, $z_0 \sim z_{29}$, which includes the first code sequence and the second code sequence, to a NodeB by carrying the code sequence on the E-DPCCH.

This step is a mapping step of the physical channel, i.e., after the code sequence of control information and PCI information are obtained, the code sequence can be mapped (namely, carried) onto the E-DPCCH.

In this embodiment, the non-serving cell can obtain the PCI information from the UE in time through the E-DPCCH, and the implementation process is simplified. Moreover, when decoding the received codes, the NodeB may decode part 1 first. If the decoding result shows that part 1 exists, the NodeB goes on to decode part 2; otherwise, the NodeB does not decode part 2. Therefore, when the UE stops transmitting data, the E-DPCCH can carry the discontinuous transmission (DTX) mode, and the NodeB can choose to decode part 1 only, which avoids futile operations.

Embodiment 4

This embodiment provides another information transmission method in CLTD mode.

The information bits over the E-DPCCH in this embodiment are grouped in a different way, and the corresponding encoding mode changes accordingly. The information carried on the E-DPCCH and the modes of encoding the information are as shown in Table 9.

TABLE 9

| E-DPCCH information and encoding | | | |
|---|---|---|---|
| Carried Information | | Amount of Information/Bits | Encoding Mode |
| Part 1 | PCI<br>RSN<br>"Happy" bit | 5 | Mapped to a 10 bits 0-1 sequence |
| Part 2 | E-TFCI | 7 | (20, 7) RM encoding |

Figure 5:
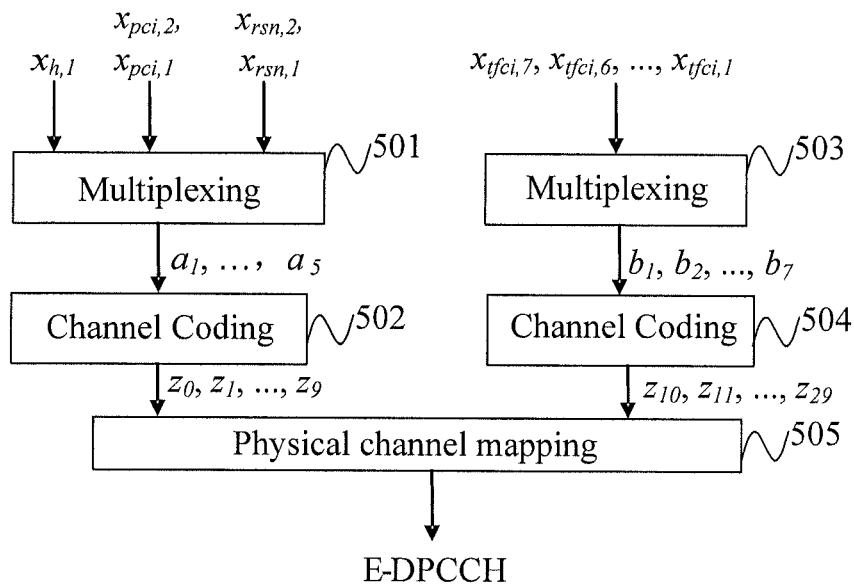
FIG. 5 is a schematic flowchart of a method for using an E-DPCCH according to a fourth embodiment of the present invention.

As shown in FIG. 5, the information transmission method in this embodiment includes the following steps:

Step 501: Multiplex retransmission sequence number bit, Happy bit, and PCI information bit to obtain the first multiplexed output bit sequence composed of 5 bits.

In the multiplexing process, the input-output relationship may be:

$$a_k = \begin{cases} x_{h,1} & k = 1 \\ x_{pci,4-k} & k = 2, 3 \\ x_{rsn,6-k} & k = 4, 5 \end{cases}$$

Step 502: Encode the first multiplexed output bit sequence to obtain the first code sequence composed of 10 bits.

The first output bit sequence is composed of 5 bits, and may be obtained through direct mapping manner, i.e., the first multiplexed output bit sequence may be mapped to the first code sequence composed of 10 bits directly according to a preset mapping relationship. The mapping relationship meets the following conditions: The first multiplexed output bit sequence is mapped to a codeword uniquely, and the code set composed of all codewords has the greatest minimum code distance. Table 10 shows an exemplary direct mapping relationship between the first output bit sequence and the code sequence in this embodiment.

TABLE 10

Encoding and mapping of part 1

| Transmission Information | | | | | Codeword | | | | | | | | | |
|---|---|---|---|---|---|---|---|---|---|---|---|---|---|---|
| Happy | PCI | | RSN | | | | | | | | | | | |
| $a_1$ | $a_2$ | $a_3$ | $a_4$ | $a_5$ | $z_0$ | $z_1$ | $z_2$ | $z_3$ | $z_4$ | $z_5$ | $z_6$ | $z_7$ | $z_8$ | $z_9$ |
| 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 0 | 1 | 1 | 1 | 1 | 1 | 1 |
| 0 | 0 | 0 | 1 | 0 | 0 | 1 | 1 | 1 | 0 | 0 | 0 | 1 | 1 | 1 |
| 0 | 0 | 0 | 1 | 1 | 1 | 0 | 1 | 1 | 0 | 1 | 1 | 0 | 0 | 1 |
| 0 | 0 | 1 | 0 | 0 | 1 | 1 | 0 | 1 | 1 | 0 | 1 | 0 | 1 | 0 |
| 0 | 0 | 1 | 0 | 1 | 1 | 1 | 1 | 0 | 1 | 1 | 0 | 1 | 0 | 0 |
| 0 | 0 | 1 | 1 | 0 | 1 | 0 | 1 | 1 | 1 | 1 | 1 | 0 | 0 | 0 |
| 0 | 0 | 1 | 1 | 1 | 1 | 0 | 1 | 1 | 1 | 0 | 0 | 1 | 1 | 0 |
| 0 | 1 | 0 | 0 | 0 | 1 | 1 | 0 | 1 | 0 | 1 | 0 | 1 | 0 | 1 |
| 0 | 1 | 0 | 0 | 1 | 1 | 1 | 1 | 0 | 0 | 0 | 1 | 0 | 1 | 1 |
| 0 | 1 | 0 | 1 | 0 | 1 | 0 | 1 | 0 | 0 | 1 | 1 | 0 | 1 | 1 |
| 0 | 1 | 0 | 1 | 1 | 1 | 1 | 0 | 0 | 0 | 0 | 1 | 1 | 0 | 0 |
| 0 | 1 | 1 | 0 | 0 | 1 | 0 | 1 | 0 | 0 | 1 | 1 | 1 | 1 | 0 |
| 0 | 1 | 1 | 0 | 1 | 1 | 0 | 1 | 0 | 1 | 0 | 0 | 0 | 0 | 1 |
| 0 | 1 | 1 | 1 | 0 | 1 | 0 | 0 | 0 | 1 | 0 | 1 | 0 | 1 | 0 |
| 0 | 1 | 1 | 1 | 1 | 1 | 0 | 0 | 1 | 0 | 1 | 0 | 0 | 1 | 0 |
| 1 | 0 | 0 | 0 | 0 | 0 | 1 | 1 | 0 | 1 | 0 | 1 | 1 | 0 | 1 |
| 1 | 0 | 0 | 0 | 1 | 0 | 1 | 1 | 0 | 0 | 1 | 0 | 0 | 1 | 0 |
| 1 | 0 | 0 | 1 | 0 | 0 | 1 | 0 | 1 | 0 | 0 | 1 | 1 | 1 | 0 |
| 1 | 0 | 0 | 1 | 1 | 0 | 1 | 0 | 1 | 1 | 0 | 0 | 0 | 0 | 1 |
| 1 | 0 | 1 | 0 | 0 | 0 | 0 | 1 | 1 | 1 | 1 | 0 | 0 | 1 | 1 |
| 1 | 0 | 1 | 0 | 1 | 0 | 0 | 1 | 1 | 0 | 0 | 1 | 1 | 0 | 0 |
| 1 | 0 | 1 | 1 | 0 | 0 | 0 | 0 | 1 | 1 | 0 | 1 | 0 | 0 | 0 |
| 1 | 0 | 1 | 1 | 1 | 0 | 1 | 0 | 1 | 0 | 1 | 0 | 1 | 0 | 1 |
| 1 | 1 | 0 | 0 | 0 | 1 | 0 | 0 | 0 | 1 | 1 | 0 | 0 | 0 | 1 |
| 1 | 1 | 0 | 0 | 1 | 1 | 0 | 0 | 0 | 0 | 0 | 0 | 1 | 1 | 1 |
| 1 | 1 | 0 | 1 | 0 | 0 | 0 | 0 | 1 | 0 | 0 | 1 | 0 | 1 | 1 |
| 1 | 1 | 0 | 1 | 1 | 0 | 0 | 1 | 0 | 0 | 1 | 0 | 1 | 0 | 1 |
| 1 | 1 | 1 | 0 | 0 | 1 | 0 | 0 | 1 | 0 | 0 | 1 | 1 | 0 | 0 |
| 1 | 1 | 1 | 0 | 1 | 0 | 1 | 0 | 0 | 1 | 1 | 1 | 0 | 0 | 0 |
| 1 | 1 | 1 | 1 | 0 | 1 | 1 | 1 | 1 | 0 | 0 | 0 | 0 | 0 | 0 |
| 1 | 1 | 1 | 1 | 1 | 1 | 1 | 1 | 1 | 1 | 1 | 1 | 1 | 1 | 1 |

In Table 10, information of part 1 ($a_1$, $a_2$, $a_3$, $a_4$, $a_5$) is mapped to a codeword ($z_0$, $z_1$, $z_2$, $z_3$, $z_4$, $z_5$, $z_6$, $z_7$, $z_8$, $z_9$) uniquely. After encoding, the minimum code distance of the code set composed of all codewords is 4, and is the maximum value of the minimum code distance of a 32-element code set. That is, there is no 32-element code set whose minimum code distance is greater than 4.

Step 503: Multiplex the TFCI bits to obtain the second multiplexed output bit sequence composed of 7 bits.

In the multiplexing process, the input-output relationship is:

$$b_k = x_{tfci,8-k} \ k=1,2,\ldots,7$$

Step 504: Encode the second multiplexed output bit sequence to obtain a 20-bit code sequence according to a code matrix and a linear combination formula. The linear combination formula may be:

$$z_{i+10} = \sum_{n=0}^{6}(b_{n+1} \times M_{i,n}) \bmod 2; \ i = 0, \ldots, 19.$$

In the formula above, $z_{i+10}$ are code elements of the code sequence, $b_{n+1}$ are output bits in the second multiplexed output bit sequence, and $M_{i,n}$ are elements in the code matrix.

In this embodiment, the (20, 7) second-order RM encoding is applied to obtain a code matrix composed of seven columns of 0-1 sequences. After encoding, the codewords are a linear combination of $M_{i,n}$. Table 11 shows $M_{i,n}$.

TABLE 11

(20, 7) RM code matrix

| i | $M_{i,0}$ | $M_{i,1}$ | $M_{i,2}$ | $M_{i,3}$ | $M_{i,4}$ | $M_{i,5}$ | $M_{i,6}$ |
|---|---|---|---|---|---|---|---|
| 0 | 1 | 0 | 0 | 0 | 0 | 0 | 0 |
| 1 | 0 | 1 | 0 | 0 | 0 | 0 | 0 |
| 2 | 0 | 0 | 1 | 0 | 0 | 0 | 0 |
| 3 | 0 | 0 | 0 | 1 | 0 | 0 | 0 |
| 4 | 0 | 0 | 0 | 0 | 1 | 0 | 0 |
| 5 | 0 | 0 | 0 | 0 | 0 | 1 | 0 |
| 6 | 0 | 0 | 0 | 0 | 0 | 0 | 1 |
| 7 | 0 | 0 | 0 | 0 | 0 | 0 | 1 |
| 8 | 1 | 0 | 0 | 0 | 0 | 1 | 1 |
| 9 | 1 | 1 | 1 | 0 | 0 | 1 | 1 |
| 10 | 0 | 1 | 0 | 1 | 0 | 0 | 1 |
| 11 | 1 | 0 | 1 | 0 | 1 | 0 | 0 |
| 12 | 1 | 1 | 1 | 1 | 0 | 0 | 0 |
| 13 | 1 | 1 | 0 | 1 | 1 | 1 | 0 |
| 14 | 0 | 1 | 1 | 0 | 1 | 0 | 1 |
| 15 | 0 | 0 | 1 | 1 | 0 | 1 | 0 |
| 16 | 0 | 0 | 1 | 1 | 1 | 1 | 1 |
| 17 | 1 | 0 | 0 | 1 | 1 | 0 | 1 |
| 18 | 0 | 1 | 0 | 0 | 1 | 1 | 0 |
| 19 | 1 | 1 | 1 | 1 | 1 | 1 | 1 |

Step 505: Send the code sequence, obtained in step 502 and step 504, for example, $z_0 \sim z_{29}$, which includes the first code sequence and the second code sequence, to a NodeB by carrying the code sequence on the E-DPCCH.

This step is a mapping step of the physical channel, i.e., after the code sequence of control information and PCI information is obtained, the code sequence can be mapped (namely, carried) onto the E-DPCCH, and sent to the NodeB.

In this embodiment, the non-serving cell can obtain the PCI information from the UE in time through the E-DPCCH, and the implementation process is more simplified than the third embodiment.

In this embodiment, whether to send part 2 may also be determined according to the value of the RSN. For example, when the value of the RSN is not 0, only information of part 1 is sent. Therefore, it is not necessary to multiplex or encode information of part 2, which saves more power consumption than the fourth embodiment.

The values of the RSN may be 0, 1, 2, and 3, and correspond to two bits. The detailed mapping relationship depends on the UE and the NodeB. For example, when the RSN value is 0, the corresponding two bits are "$x_{rsn},1=0$" and "$x_{rsn},2=0$".

Figure 6:
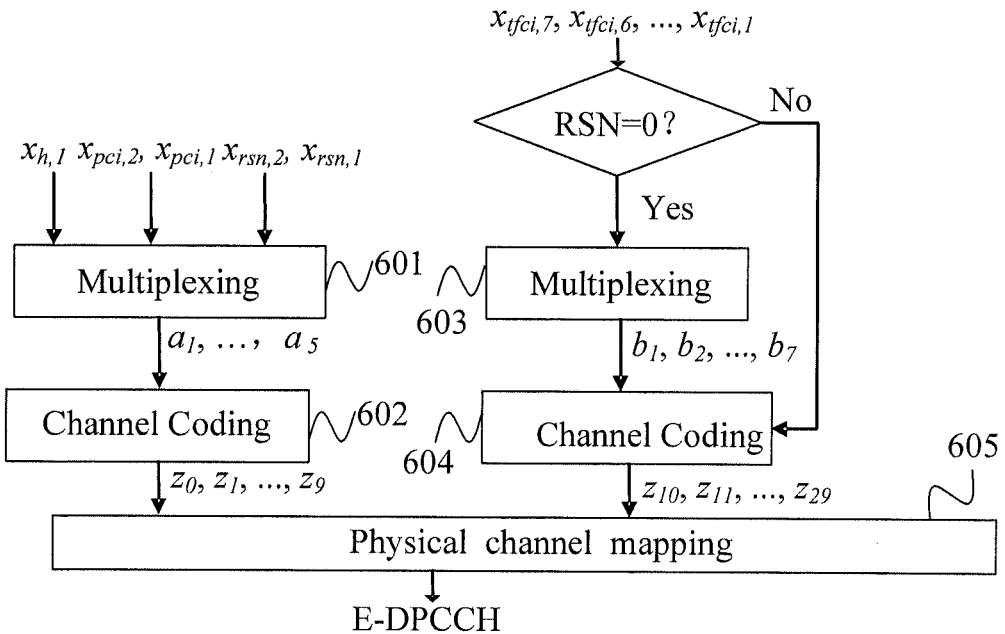
FIG. 6 is a schematic flowchart of another method for using an E-DPCCH according to the fourth embodiment of the present invention.

As shown in FIG. 6, in the case of determining whether to send the information of part 2 according to the RSN value, the information transmission method in this embodiment includes the following steps:

Steps 601-602 are the same as steps 501-502.

If the RSN value is 0, the procedure proceeds to step 603; otherwise, the procedure proceeds to step 604.

Step 603: If the RSN value is 0, after the information bits of part 2 are multiplexed, the (20, 7) RM encoding is applied to obtain a code matrix composed of seven 0-1 sequences. After the encoding, the codewords are a linear combination of $M_{i,n}$. Table 11 shows the definition of $M_{i,n}$. The following is an exemplary linear combination formula for encoding the second multiplexed output bit sequence which is output after the information of part 2 in Table 9 is multiplexed:

$$z_{i+10} = \sum_{n=0}^{6}(b_{n+1} \times M_{i,n}) \bmod 2; i = 0, \ldots, 19$$

Step 604: When the RSN is greater than 0, it is not necessary to send part 2. In this case, it is deemed that the code sequence of part 2 is sent in DTX mode, or that the code sequence of part 2 is null. In this case:

$z_{i+10}=$DTX; i=0, ... ,19.

In the formula above, $z_{i+10}$ is a code element of the code sequence.

Step 605: Send the code sequence obtained by encoding, to a NodeB by carrying the code sequence on a E-DPCCH.

When the value of the RSN is not 0 (for example, greater than 0), the NodeB may choose not to decode part 2 after receiving part 1 correctly. Therefore, this embodiment saves power consumption when the UE and the NodeB are in the data retransmission state.

The technical solution of this embodiment enables a non-serving cell to obtain the PCI information from the UE in time through the E-DPCCH, and the implementation process is more simplified than the third embodiment. In the case that no data is transmitted, the NodeB may choose to decode part 1 only. In the case that data is transmitted, this embodiment saves more power consumption than the fourth embodiment: When the RSN value is greater than 0, the channel does not send the E-TFCI part; after receiving part 1 correctly, the NodeB may not receive part 2, which saves the power consumption of the UE and NodeB.

This embodiment is not limited to the form of grouping the information bits carried on the E-DPCCH described in the third embodiment and the fourth embodiment. Instead, the information bits may be divided into two groups in other combination modes, and the two groups of data are encoded separately. The encoding mode may be: multiplexing the grouped information bits, and then mapping the information bits directly according to a preset mapping relationship; or applying a linear combination encoding mode of the code matrix. Generally, if the information bits are a small amount of information, the direct mapping mode is applicable; if the information bits are a large amount of information, the linear combination encoding mode of the code matrix is applicable. In the case of direct mapping, the mapping relationship preferably meets the following conditions: The multiplexed bit sequence is mapped to a codeword uniquely, and the code set composed of all codewords has the greatest minimum code distance.

Embodiment 5

This embodiment provides a method for using and encoding an E-DPCCH in wireless communication in single-stream MIMO mode.

Because the uplink single-stream MIMO mode is equivalent to the uplink CLTD mode, the solution to the uplink CLTD mode is also a solution to the uplink single-stream MIMO mode. Any solution in embodiments 1-4 can serve as a method for using and encoding an E-DPCCH in wireless communication in uplink single-stream MIMO mode in this embodiment.

Embodiment 6

This embodiment provides a method for using and encoding an E-DPCCH in wireless communication in dual-stream MIMO mode.

In dual-stream MIMO mode, two different data streams exist, and the UE needs to configure the corresponding control information for each data stream, as shown in Table 2. In this case, two E-DPCCHs may be applied: E-DPCCH$_1$ and E-DPCCH$_2$, and each E-DPCCH controls a stream. Because the problems in the macro diversity scenario still exist in the dual-stream MIMO mode, the UE can still broadcast PCI information to the NodeB. The PCI information may be carried on only one of the E-DPCCHs. The detailed format is:

E-DPCCH$_1$: UL CLTD E-DPCCH format; and

E-DPCCH$_2$: R8 E-DPCCH format.

That is, the information carried on the control channel E-DPCCH$_1$ corresponding to the first data stream is as shown in Table 4, and the information carried on the control channel E-DPCCH$_2$ corresponding to the second data stream is as shown in Table 2.

As regards how to transmit the PCI information carried on E-DPCCH$_1$, the method for using E-DPCCH$_1$ is applicable, and any solution in embodiments 1-4 is applicable.

Persons of ordinary skill in the art understand that all or a part of the steps of the method in this embodiment of the present invention may be implemented by a program instructing relevant hardware. The program may be stored in computer readable storage media such as a Read Only Memory (ROM), a Random Access Memory (RAM), a magnetic disk or a Compact Disk-Read Only Memory (CD-ROM).

Embodiment 7

Figure 7:
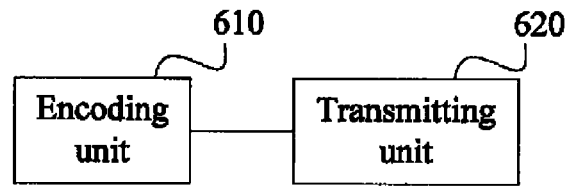
FIG. 7 is a structural block diagram of an apparatus that uses an E-DPCCH according to a seventh embodiment of the present invention.

A UE is provided in this embodiment. As shown in FIG. 7, the UE includes an encoding unit 610 and a transmitting unit 620.

The encoding unit 610 is configured to encode an information bit sequence corresponding to data stream control information and PCI information to obtain a code sequence.

The transmitting unit 620 is configured to send the code sequence obtained by encoding to a NodeB by carrying the code sequence on an E-DPCCH.

By using the method in this embodiment, the UE in a macro diversity state feeds back PCI information to the NodeB of the non-serving cell, and the non-serving cell obtains the PCI information in time.

Embodiment 8

Figure 8:
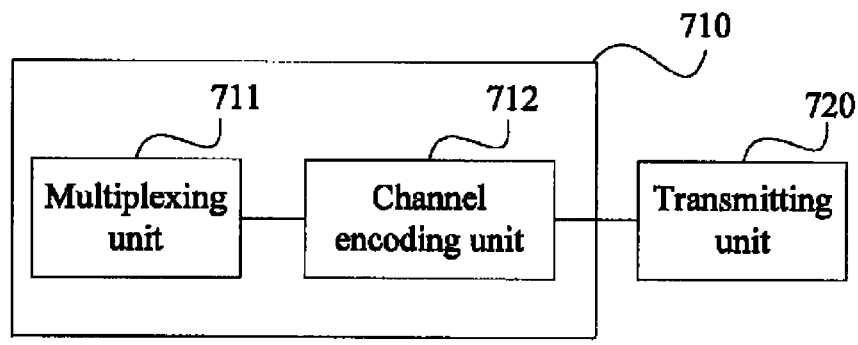
FIG. 8 is a structural block diagram of an apparatus that uses an E-DPCCH according to an eighth embodiment of the present invention.

A UE is provided in this embodiment. As shown in FIG. 8, the UE includes:

an encoding unit 710, configured to encode an information bit sequence corresponding to data stream control information and PCI information to obtain a 30-bit code sequence; and a transmitting unit 720, configured to receive the code sequence obtained by the encoding unit 610, and to carry the encoded data stream control information and PCI information on an E-DPCCH.

The encoding unit 710 includes:

a multiplexing unit 711, configured to multiplex an information bit sequence corresponding to data stream control information and PCI information to obtain a 12-bit output bit sequence, where output bits are $y_k$ (k=1, 2, ..., ..., 12); and a channel encoding unit 712, connected to the multiplexing unit, and configured to encode the multiplexed output bit sequence to obtain a 30-bit code sequence according to a code matrix and a linear combination formula.

The linear combination formula may be:

$$z_i = \sum_{n=0}^{11} (y_{n+1} \times M_{i,n}) \bmod 2, \text{ where, } i = 0, \ldots, 29.$$

In the formula above, $z_i$ are code elements of the code sequence, $y_{n+1}$ are output bits in the output bit sequence, and $M_{i,n}$ are elements in the code matrix.

In this embodiment, the non-serving cell can obtain the PCI information from the UE in time through the E-DPCCH, and the NodeB of the cell can perform correct decoding at lower power.

Embodiment 9

Figure 9:
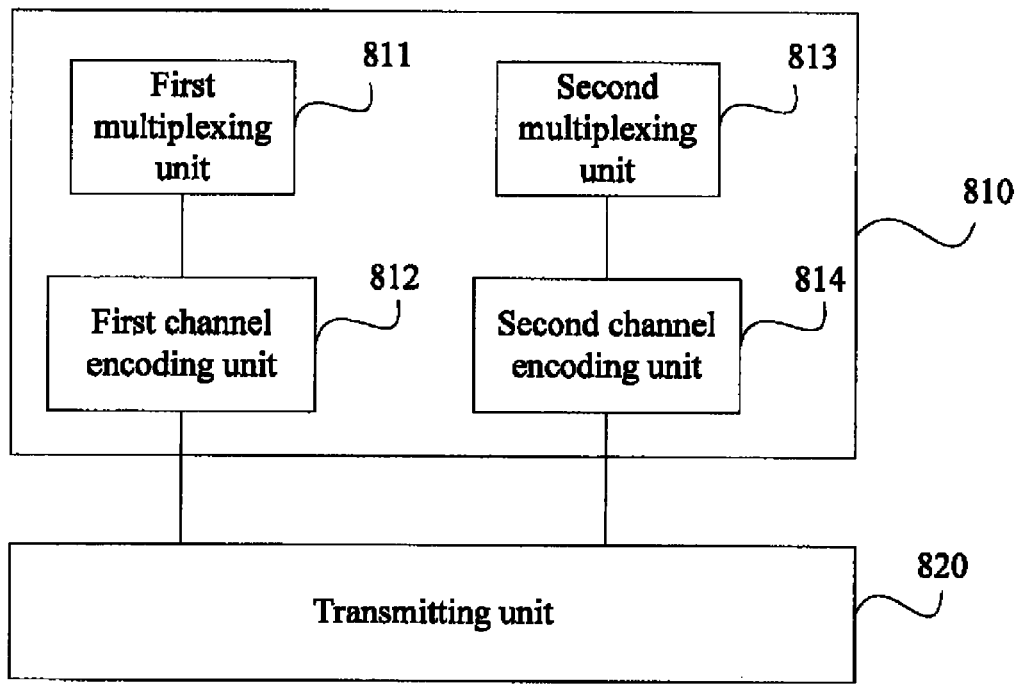
FIG. 9 is a structural block diagram of an apparatus that uses an E-DPCCH according to a ninth embodiment of the present invention.

A UE is provided in this embodiment. As shown in FIG. 9, the UE includes:

an encoding unit 810, configured to encode an information bit sequence corresponding to data stream control information and PCI information to obtain a 30-bit code sequence; and a transmitting unit 820, configured to receive the code sequence obtained by the encoding unit 810, and to carry the encoded data stream control information and PCI information on an E-DPCCH.

The encoding unit includes:

a first multiplexing unit 811, configured to multiplex the PCI information bit sequence to obtain a 2-bit output bit sequence of PCI information;

a second multiplexing unit 813, configured to multiplex the bit sequence of data stream control information to obtain a 10-bit output bit sequence of data stream control information;

a first channel encoding unit 812, configured to encode the output bit sequence of PCI information to obtain a first code sequence composed of 10 bits; and a second channel encoding unit 814, configured to encode the output bit sequence of data stream control information to obtain a second code sequence composed of 20 bits according to a code matrix and a linear combination formula.

The linear combination formula may be:

$$z_{i+10} = \sum_{n=0}^{9} (y_{n+1} \times M_{i,n}) \bmod 2, \, i = 0, \ldots, 19.$$

In the formula above, $z_{i+10}$ are code elements of the code sequence, $y_{n+1}$ are output bits in the output bit sequence of data stream control information, and $M_{i,n}$ are elements in the code matrix.

In this embodiment, the non-serving cell can obtain the PCI information from the UE in time through the E-DPCCH, and the implementation process is simplified. Moreover, when decoding the received codes, the NodeB may decode part 1 first. If the decoding result shows that part 1 exists, the NodeB goes on to decode part 2; otherwise, the NodeB does not decode part 2. Therefore, when the UE stops transmitting data, the E-DPCCH can carry the DTX, and the NodeB can choose to decode part 1 only, which avoids futile operations.

Embodiment 10

Figure 10:
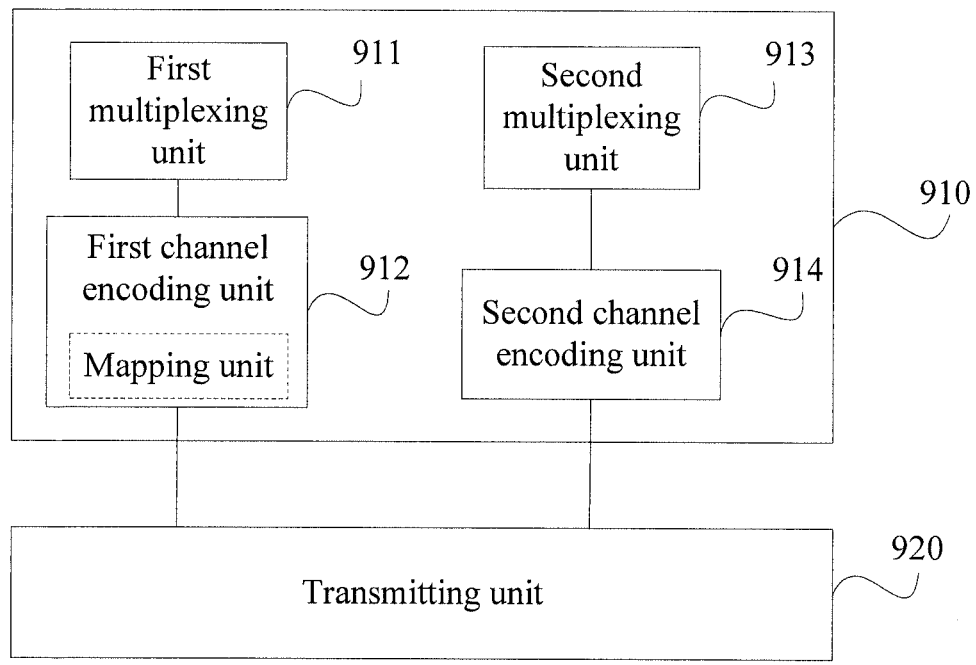
FIG. 10 is a structural block diagram of an apparatus that uses an E-DPCCH according to a tenth embodiment of the present invention.

A UE is provided in this embodiment. As shown in FIG. 10, the UE includes:

an encoding unit 910, configured to encode an information bit sequence corresponding to data stream control information and PCI information to obtain a 30-bit code sequence; and a transmitting unit 920, configured to receive the code sequence obtained by the encoding unit 910, and to carry the encoded data stream control information and PCI information on an E-DPCCH.

The encoding unit includes:

a first multiplexing unit 911, configured to multiplex the PCI information bits, and multiplex RSN bits and Happy bits in the data stream control information to obtain a first multiplexed output bit sequence composed of 5 bits;

a first channel encoding unit 912, configured to encode the first multiplexed output bit sequence to obtain a 10-bit code sequence;

a second multiplexing unit 913, configured to multiplex TFCI bits in the data stream control information to obtain the second multiplexed output bit sequence composed of 7 bits; and a second channel encoding unit 914, configured to encode the second multiplexed output bit sequence to obtain a 20-bit code sequence according to a code matrix and a linear combination formula.

For example, the linear combination formula is:

$$z_{i+10} = \sum_{n=0}^{6} (b_{n+1} \times M_{i,n}) \bmod 2; \, i = 0, \ldots, 19.$$

In the formula above, $z_{i+10}$ are code elements of the code sequence, $b_{n+1}$ are output bits in the second multiplexed output bit sequence, and $M_{i,n}$ are elements in the code matrix.

In this embodiment, the non-serving cell can obtain the PCI information from the UE in time through the E-DPCCH, and the implementation process is more simplified than the ninth embodiment.

Figure 11:
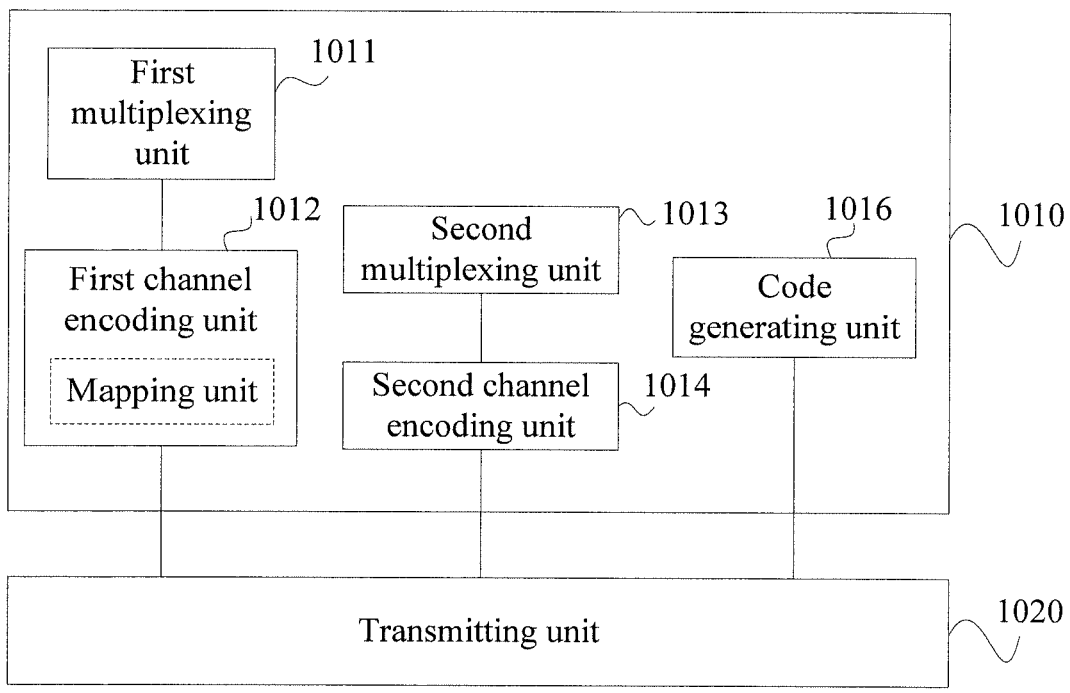
FIG. 11 is a structural block diagram of another apparatus that uses an E-DPCCH according to a tenth embodiment of the present invention.

As shown in FIG. 11, in another embodiment of the present invention, the encoding unit includes:

a first multiplexing unit 1011, configured to multiplex the PCI information bits, and multiplex RSN bits and Happy bits in the data stream control information to obtain a first multiplexed output bit sequence composed of 5 bits;

a first channel encoding unit 1012, configured to encode the first multiplexed output bit sequence to obtain a first code sequence composed of 10 bits, where the first channel encoding unit may include a mapping unit which is configured to map the first multiplexed output bit sequence directly to obtain a first code sequence according to a preset mapping relationship, where the mapping relationship meets the following conditions: the first multiplexed output bit sequence is mapped to a codeword uniquely, and the code set composed of all codewords has the greatest minimum code distance;

a code generating unit 1016, configured to obtain a second code sequence of DTX when the value of the RSN is not 0, where $z_{i+10}$=DTX; i=0, . . . , 19;

a second multiplexing unit 1013, configured to multiplex TFCI bits to obtain a second multiplexed output bit sequence composed of 7 bits when the value of the RSN is 0; and a second channel encoding unit 1014, configured to encode the second multiplexed output bit sequence to obtain a second code sequence composed of 20 bits.

The second channel encoding unit may encode the second multiplexed output bit sequence to obtain a 20-bit code sequence according to a code matrix and a linear combination formula.

For example, the linear combination formula is:

$$z_{i+10} = \sum_{n=0}^{6} (b_{n+1} \times M_{i,n}) \bmod 2; \ i = 0, \ldots, 19.$$

In the formula above, $z_{i+10}$ are code elements of the code sequence, $b_n$ are output bits in the second multiplexed output bit sequence, and $M_{i,n}$ are elements in the code matrix.

In this embodiment, the non-serving cell can obtain the PCI information from the UE in time through the E-DPCCH, and the implementation process is more simplified than the ninth embodiment. This embodiment saves power consumption when the UE and the NodeB are in the data retransmission state.

Described above are the objectives, technical solution and benefits of the embodiments of the present invention. Although the invention has been described through some exemplary embodiments, the invention is not limited to such embodiments. It is apparent that those skilled in the art can make modifications, equivalent replacements, or improvements to the invention without departing from the spirit and scope of the invention. The invention is intended to cover the modifications, equivalent replacements, or improvements provided that they fall within the protection scope defined by the following claims or their equivalents.

What is claimed is:

1. An information transmission method, comprising:
encoding an information bit sequence corresponding to data stream control information and Precoding Control Indication (PCI) information to obtain a code sequence; and
sending the code sequence to a NodeB by carrying the code sequence on a Physical Uplink Control Channel (PUCCH),
wherein the encoding the information bit sequence corresponding to the data stream control information and the PCI information comprises:
multiplexing the information bit sequence corresponding to the data stream control information and the PCI information to obtain an output bit sequence; and
encoding multiplexed information bits to obtain a 30-bit code sequence according to a code matrix and a linear combination formula;

wherein the linear combination formula is:

$$z_i = \sum_{n=0}^{11} (y_{n+1} \times M_{i,n}) \bmod 2, \text{ where, } i = 0, \ldots, 29,$$

wherein $z_i$ are code elements of the code sequence, $y_{n+1}$ are output bits in the output bit sequence, and $M_{i,n}$ are elements of the code matrix; and
the code matrix is:

| i | $M_{i,0}$ | $M_{i,1}$ | $M_{i,2}$ | $M_{i,3}$ | $M_{i,4}$ | $M_{i,5}$ | $M_{i,6}$ |
|---|---|---|---|---|---|---|---|
| 0 | 1 | 0 | 0 | 0 | 0 | 1 | 0 |
| 1 | 0 | 1 | 0 | 0 | 0 | 1 | 1 |
| 2 | 1 | 1 | 0 | 0 | 0 | 1 | 0 |
| 3 | 0 | 0 | 1 | 0 | 0 | 1 | 1 |
| 4 | 1 | 0 | 1 | 0 | 0 | 1 | 0 |
| 5 | 0 | 1 | 1 | 0 | 0 | 1 | 0 |
| 6 | 1 | 1 | 1 | 0 | 0 | 1 | 0 |
| 7 | 0 | 0 | 0 | 1 | 0 | 1 | 0 |
| 8 | 1 | 0 | 0 | 1 | 0 | 1 | 1 |
| 9 | 0 | 1 | 0 | 1 | 0 | 1 | 1 |
| 10 | 1 | 1 | 0 | 1 | 0 | 1 | 0 |
| 11 | 0 | 0 | 1 | 1 | 0 | 1 | 0 |
| 12 | 1 | 0 | 1 | 1 | 0 | 1 | 0 |
| 13 | 0 | 1 | 1 | 1 | 0 | 1 | 1 |
| 14 | 1 | 1 | 1 | 1 | 0 | 1 | 1 |
| 15 | 1 | 0 | 0 | 0 | 1 | 1 | 1 |
| 16 | 0 | 1 | 0 | 0 | 1 | 1 | 1 |
| 17 | 1 | 1 | 0 | 0 | 1 | 1 | 1 |
| 18 | 0 | 0 | 1 | 0 | 1 | 1 | 0 |
| 19 | 1 | 0 | 1 | 0 | 1 | 1 | 0 |
| 20 | 0 | 1 | 1 | 0 | 1 | 1 | 0 |
| 21 | 1 | 1 | 1 | 0 | 1 | 1 | 0 |
| 22 | 0 | 0 | 0 | 1 | 1 | 1 | 0 |
| 23 | 1 | 0 | 0 | 1 | 1 | 1 | 1 |
| 24 | 0 | 1 | 0 | 1 | 1 | 1 | 1 |
| 25 | 1 | 1 | 0 | 1 | 1 | 1 | 1 |
| 26 | 0 | 0 | 1 | 1 | 1 | 1 | 0 |
| 27 | 1 | 0 | 1 | 1 | 1 | 1 | 1 |
| 28 | 0 | 1 | 1 | 1 | 1 | 1 | 1 |
| 29 | 1 | 1 | 1 | 1 | 1 | 1 | 1 |

| i | $M_{i,7}$ | $M_{i,8}$ | $M_{i,9}$ | $M_{i,10}$ | $M_{i,11}$ |
|---|---|---|---|---|---|
| 0 | 0 | 0 | 0 | 0 | 0 |
| 1 | 0 | 0 | 0 | 0 | 0 |
| 2 | 0 | 0 | 1 | 0 | 0 |
| 3 | 0 | 1 | 1 | 0 | 0 |
| 4 | 0 | 0 | 1 | 0 | 0 |
| 5 | 0 | 1 | 0 | 0 | 0 |
| 6 | 1 | 0 | 0 | 0 | 0 |
| 7 | 1 | 1 | 0 | 0 | 0 |
| 8 | 1 | 1 | 0 | 0 | 0 |
| 9 | 0 | 1 | 1 | 1 | 0 |
| 10 | 0 | 1 | 1 | 0 | 1 |
| 11 | 1 | 1 | 0 | 0 | 1 |
| 12 | 1 | 0 | 1 | 1 | 0 |
| 13 | 0 | 0 | 1 | 0 | 0 |
| 14 | 1 | 1 | 1 | 0 | 1 |
| 15 | 1 | 0 | 0 | 0 | 0 |
| 16 | 1 | 0 | 1 | 1 | 0 |
| 17 | 0 | 1 | 0 | 1 | 0 |
| 18 | 1 | 1 | 1 | 1 | 0 |
| 19 | 1 | 0 | 1 | 0 | 1 |
| 20 | 0 | 1 | 1 | 1 | 0 |
| 21 | 1 | 1 | 1 | 0 | 1 |
| 22 | 1 | 0 | 0 | 1 | 1 |
| 23 | 1 | 0 | 1 | 1 | 0 |
| 24 | 0 | 1 | 0 | 0 | 1 |
| 25 | 0 | 0 | 1 | 1 | 1 |
| 26 | 0 | 1 | 0 | 1 | 0 |
| 27 | 1 | 0 | 0 | 0 | 1 |
| 28 | 1 | 1 | 0 | 1 | 0 |
| 29 | 1 | 1 | 1 | 0 | 1. |

2. A User Equipment (UE), comprising:
an encoding unit, configured to encode an information bit sequence corresponding to data stream control information and Precoding Control Indication (PCI) information to obtain a code sequence; and
a transmitting unit, configured to send the code sequence to a NodeB by carrying the code sequence on a Physical Uplink Control Channel (PUCCH),
wherein the encoding unit comprises:
a first multiplexing unit, configured to multiplex the PCI information bits, and multiplex Retransmission Sequence Number (RSN) bits and Happy bits in the data stream control information to obtain a first multiplexed output bit sequence;
a first channel encoding unit, configured to encode the first multiplexed output bit sequence to obtain a first code sequence; and
a second encoding unit, configured to encode Transport Format Combination Indicator (TFCI) bits in the data stream control information to obtain a second code sequence,
wherein the first channel encoding unit comprises a mapping unit which is configured to map the first multiplexed output bit sequence directly to obtain the first code sequence according to a preset mapping relationship, wherein the mapping relationship meets the following conditions: the first multiplexed output bit sequence is mapped to a codeword uniquely, and a code set composed of all codewords has a greatest minimum code distance.

3. The UE according to claim 2, wherein the second encoding unit comprises:
a second multiplexing unit, configured to multiplex the TFCI bits in the data stream control information to obtain a second multiplexed output bit sequence; and
a second channel encoding unit, configured to encode the second multiplexed output bit sequence to obtain the second code sequence according to a code matrix and a linear combination formula.

4. The UE according to claim 2, wherein the second encoding unit comprises:
a second multiplexing unit, configured to multiplex the TFCI bits to obtain a second multiplexed output bit sequence when value of the RSN is 0; and
a second channel encoding unit, configured to encode the second multiplexed output bit sequence to obtain the second code sequence according to a code matrix and a linear combination formula; wherein
the second encoding unit further comprises:
a code generating unit, configured to obtain the second code sequence of Discontinuously Transmitted (DTX) when value of the RSN is not 0.

5. An information transmission method, comprising:
encoding an information bit sequence corresponding to data stream control information and Precoding Control Indication (PCI) information to obtain a code sequence; and
sending the code sequence to a NodeB by carrying the code sequence on a Physical Uplink Control Channel (PUCCH),
wherein the encoding the information bit sequence corresponding to the data stream control information and the PCI information comprises:
multiplexing a bit sequence of the data stream control information and a bit sequence the PCI information respectively to obtain an output bit sequence of the data stream control information and an output bit sequence of the PCI information respectively;
encoding the output bit sequence of the PCI information to obtain a first code sequence composed of 10 bits; and
encoding the output bit sequence of the data stream control information to obtain a second code sequence composed of 20 bits according to a code matrix and a linear combination formula,
wherein the linear combination formula is:

$$z_{i+10} = \sum_{n=0}^{9} (y_{n+1} \times M_{i,n}) \bmod 2, \; i = 0, \ldots, 19,$$

wherein $z_{i+10}$ are code elements of the second code sequence, $y_{n+1}$ are output bits in the output bit sequence of the data stream control information, and $M_{i,n}$ are elements of the code matrix; and the code matrix is:

| i  | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|----|-----|-----|-----|-----|-----|-----|-----|-----|-----|-----|
| 0  | 1 | 0 | 0 | 0 | 0 | 0 | 0 | 0 | 0 | 0 |
| 1  | 0 | 1 | 0 | 0 | 0 | 0 | 0 | 0 | 0 | 0 |
| 2  | 0 | 0 | 0 | 1 | 0 | 0 | 0 | 0 | 0 | 0 |
| 3  | 0 | 0 | 0 | 0 | 1 | 0 | 0 | 0 | 0 | 0 |
| 4  | 0 | 0 | 0 | 0 | 0 | 1 | 0 | 0 | 0 | 0 |
| 5  | 0 | 0 | 0 | 0 | 0 | 0 | 0 | 1 | 0 | 0 |
| 6  | 0 | 0 | 0 | 0 | 0 | 0 | 0 | 0 | 1 | 0 |
| 7  | 0 | 0 | 0 | 0 | 0 | 0 | 0 | 0 | 0 | 1 |
| 8  | 1 | 0 | 1 | 0 | 0 | 0 | 1 | 1 | 1 | 0 |
| 9  | 1 | 1 | 0 | 1 | 0 | 0 | 0 | 1 | 1 | 1 |
| 10 | 0 | 1 | 1 | 0 | 1 | 0 | 0 | 0 | 1 | 1 |
| 11 | 1 | 0 | 1 | 1 | 0 | 1 | 0 | 0 | 0 | 1 |
| 12 | 1 | 1 | 0 | 1 | 1 | 0 | 1 | 0 | 0 | 0 |
| 13 | 1 | 1 | 1 | 0 | 1 | 1 | 0 | 1 | 0 | 0 |
| 14 | 0 | 1 | 1 | 1 | 0 | 1 | 1 | 0 | 1 | 0 |
| 15 | 0 | 0 | 1 | 1 | 1 | 0 | 1 | 1 | 0 | 1 |
| 16 | 0 | 0 | 0 | 1 | 1 | 1 | 0 | 1 | 1 | 0 |
| 17 | 1 | 0 | 0 | 0 | 1 | 1 | 1 | 0 | 1 | 1 |
| 18 | 0 | 1 | 0 | 0 | 0 | 1 | 1 | 1 | 0 | 1 |
| 19 | 1 | 1 | 1 | 1 | 1 | 1 | 1 | 1 | 1 | 1. |

6. The method according to claim 5, wherein the encoding the output bit sequence of the PCI information comprises:

mapping the output bit sequence of the PCI information directly to obtain the first code sequence according to a preset mapping relationship, wherein the mapping relationship meets the following conditions: each output bit sequence of the PCI information is mapped to a codeword uniquely, and a code set composed of codewords has a greatest minimum code distance.

7. An information transmission method, comprising:

encoding an information bit sequence corresponding to data stream control information and Precoding Control Indication (PCI) information to obtain a code sequence; and sending the code sequence to a NodeB by carrying the code sequence on a Physical Uplink Control Channel (PUCCH), wherein the data stream control information comprises: Retransmission Sequence Number (RSN) bits, Happy bits, and Transport Format Combination Indicator (TFCI) bits, wherein the encoding the information bit sequence corresponding to the data stream control information and the PCI information comprises:

multiplexing the RSN bits, the Happy bits, and PCI information bits to obtain a first multiplexed output bit sequence;

encoding the first multiplexed output bit sequence to obtain a first code sequence composed of 10 bits;

multiplexing the TFCI bits to obtain a second multiplexed output bit sequence; and encoding the second multiplexed output bit sequence to obtain a second code sequence composed of 20 bits, the encoding the first multiplexed output bit sequence comprises:

mapping the first multiplexed output bit sequence directly to obtain the first code sequence according to a preset mapping relationship, wherein the mapping relationship meets the following conditions: each first multiplexed output bit sequence is mapped to a codeword uniquely, and a code set composed of all codewords has a greatest minimum code distance, and the encoding the second multiplexed output bit sequence comprises:

encoding the second multiplexed output bit sequence to obtain the second code sequence composed of 20 bits according to a code matrix and a linear combination formula.

8. The method according to claim 7, wherein the linear combination formula is:

$$z_{i+10} = \sum_{n=0}^{6} (b_{n+1} \times M_{i,n}) \bmod 2; \ i = 0, \ldots, 19,$$

wherein $z_{i+10}$ are code elements of the second code sequence, $b_{n+1}$ are output bits in the second multiplexed output bit sequence, and $M_{i,n}$ are elements of the code matrix; and the code matrix is:

| i | $M_{i,0}$ | $M_{i,1}$ | $M_{i,2}$ | $M_{i,3}$ | $M_{i,4}$ | $M_{i,5}$ | $M_{i,6}$ |
|---|---|---|---|---|---|---|---|
| 0 | 1 | 0 | 0 | 0 | 0 | 0 | 0 |
| 1 | 0 | 1 | 0 | 0 | 0 | 0 | 0 |
| 2 | 0 | 0 | 1 | 0 | 0 | 0 | 0 |
| 3 | 0 | 0 | 0 | 1 | 0 | 0 | 0 |
| 4 | 0 | 0 | 0 | 0 | 1 | 0 | 0 |
| 5 | 0 | 0 | 0 | 0 | 0 | 1 | 0 |
| 6 | 0 | 0 | 0 | 0 | 0 | 0 | 1 |
| 7 | 0 | 0 | 0 | 0 | 0 | 0 | 1 |
| 8 | 1 | 0 | 0 | 0 | 0 | 1 | 1 |
| 9 | 1 | 1 | 1 | 0 | 0 | 1 | 1 |
| 10 | 0 | 1 | 0 | 1 | 0 | 0 | 1 |
| 11 | 1 | 0 | 1 | 0 | 1 | 0 | 0 |
| 12 | 1 | 1 | 1 | 1 | 0 | 0 | 0 |
| 13 | 1 | 1 | 0 | 1 | 1 | 1 | 0 |
| 14 | 0 | 1 | 1 | 0 | 1 | 0 | 1 |
| 15 | 0 | 0 | 1 | 1 | 0 | 1 | 0 |
| 16 | 0 | 0 | 1 | 1 | 1 | 1 | 1 |
| 17 | 1 | 0 | 0 | 1 | 1 | 0 | 1 |
| 18 | 0 | 1 | 0 | 0 | 1 | 1 | 0 |
| 19 | 1 | 1 | 1 | 1 | 1 | 1 | 1. |

9. The method according to claim 7, further comprising:

obtaining a second code sequence of Discontinuously Transmitted (DTX) when value of the RSN is not 0.

10. An information transmission method, comprising:

encoding an information bit sequence corresponding to data stream control information and Precoding Control Indication (PCI) information to obtain a code sequence; and sending the code sequence to a NodeB by carrying the code sequence on a Physical Uplink Control Channel (PUCCH), wherein the data stream control information comprises: Retransmission Sequence Number (RSN) bits, Happy bits, and Transport Format Combination Indicator (TFCI) bits, wherein the encoding the information bit sequence corresponding to the data stream control information and the PCI information comprises:

multiplexing the RSN bits, the Happy bits, and PCI information bits to obtain a first multiplexed output bit sequence;

encoding the first multiplexed output bit sequence to obtain a first code sequence composed of 10 bits;

multiplexing the TFCI bits to obtain a second multiplexed output bit sequence when value of the RSN is 0; and encoding the second multiplexed output bit sequence to obtain the second code sequence composed of 20 bits, the encoding the first multiplexed output bit sequence comprises:

mapping the first multiplexed output bit sequence directly to obtain the first code sequence according to a preset mapping relationship, wherein the mapping relationship meets the following conditions: each first multiplexed output bit sequence is mapped to a codeword uniquely, and a code set composed of all codewords has a greatest minimum code distance, and the encoding the second multiplexed output bit sequence comprises:

encoding the second multiplexed output bit sequence to obtain the second code sequence composed of 20 bits according to a code matrix and a linear combination formula.

11. A User Equipment (UE), comprising:
an encoding unit, configured to encode an information bit sequence corresponding to data stream control information and Precoding Control Indication (PCI) information to obtain a code sequence; and
a transmitting unit, configured to send the code sequence to a NodeB by carrying the code sequence on a Physical Uplink Control Channel (PUCCH),
wherein the encoding unit comprises:
- a first multiplexing unit, configured to multiplex the PCI information bits, and multiplex Retransmission Sequence Number (RSN) bits and Happy bits in the data stream control information to obtain a first multiplexed output bit sequence;
- a first channel encoding unit, configured to encode the first multiplexed output bit sequence to obtain a first code sequence; and
- a second encoding unit, configured to encode Transport Format Combination Indicator (TFCI) bits in the data stream control information to obtain a second code sequence, wherein the first channel encoding unit comprises a mapping unit which is configured to map the first multiplexed output bit sequence directly to obtain the first code sequence according to a preset mapping relationship, wherein the mapping relationship meets the following conditions: the first multiplexed output bit sequence is mapped to a codeword uniquely, and a code set composed of codewords has a greatest minimum code distance, and wherein the second encoding unit comprises:
- a second multiplexing unit, configured to multiplex the TFCI bits in the data stream control information to obtain a second multiplexed output bit sequence; and
- a second channel encoding unit, configured to encode the second multiplexed output bit sequence to obtain the second code sequence according to a code matrix and a linear combination formula.

12. A User Equipment (UE), comprising:
an encoding unit, configured to encode an information bit sequence corresponding to data stream control information and Precoding Control Indication (PCI) information to obtain a code sequence; and
a transmitting unit, configured to send the code sequence to a NodeB by carrying the code sequence on a Physical Uplink Control Channel (PUCCH),
wherein the encoding unit comprises:
- a first multiplexing unit, configured to multiplex the PCI information bits, and multiplex Retransmission Sequence Number (RSN) bits and Happy bits in the data stream control information to obtain a first multiplexed output bit sequence;
- a first channel encoding unit, configured to encode the first multiplexed output bit sequence to obtain a first code sequence; and
- a second encoding unit, configured to encode Transport Format Combination Indicator (TFCI) bits in the data stream control information to obtain a second code sequence, wherein the first channel encoding unit comprises a mapping unit which is configured to map the first multiplexed output bit sequence directly to obtain the first code sequence according to a preset mapping relationship, wherein the mapping relationship meets the following conditions: the first multiplexed output bit sequence is mapped to a codeword uniquely, and a code set composed of all codewords has a greatest minimum code distance, and wherein the second encoding unit comprises:
- a second multiplexing unit, configured to multiplex the TFCI bits to obtain a second multiplexed output bit sequence when value of the RSN is 0; and
- a second channel encoding unit, configured to encode the second multiplexed output bit sequence to obtain the second code sequence according to a code matrix and a linear combination formula; and
- a code generating unit, configured to obtain the second code sequence of Discontinuously Transmitted (DTX) when value of the RSN is not 0.

* * * * *